Figures 1, 2:
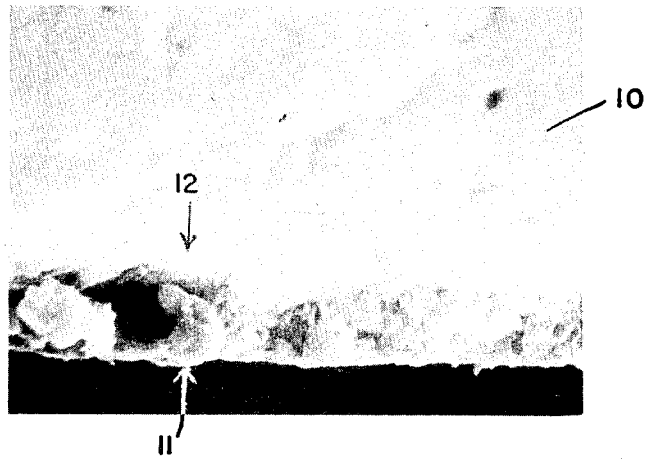

United States Patent [19]

Borbely et al.

[11] 3,865,608
[45] Feb. 11, 1975

[54] METHOD OF COATING A DIE CAVITY SURFACE AND THE COATED SURFACE

[75] Inventors: Alexander S. Borbely; Jon A. Bereman, both of Indianapolis, Ind.

[73] Assignee: P. R. Mallory & Co. Inc., Indianapolis, Ind.

[22] Filed: Feb. 2, 1973

[21] Appl. No.: 328,924

[52] U.S. Cl. .............. 117/5.3, 106/38.28, 117/49, 117/69
[51] Int. Cl. .............................. B22c 9/12
[58] Field of Search .............. 106/38.28, 38.27, 56; 117/5.3, 5.1, 127, 169 R, 69, 49, 113

[56] References Cited
UNITED STATES PATENTS

| | | | |
|---|---|---|---|
| 2,217,802 | 10/1940 | Koehring | 106/38.27 |
| 3,022,190 | 2/1962 | Feldman | 117/5.1 X |
| 3,140,190 | 7/1964 | DiLazzaro | 106/56 |
| 3,211,560 | 10/1965 | Fair | 106/32.27 |
| 3,266,106 | 8/1966 | Lirones | 106/38.28 X |
| 3,775,140 | 11/1973 | Visser et al. | 106/56 |

FOREIGN PATENTS OR APPLICATIONS

| | | | |
|---|---|---|---|
| 13,084 | 12/1970 | Japan | 117/5.3 |
| 201,913 | 12/1923 | Great Britain | 106/38.28 |

*Primary Examiner*—Ralph Husack
*Attorney, Agent, or Firm*—Charles W. Hoffmann; Robert F. Meyer; Donald W. Hanson

[57] ABSTRACT

A surface, such as a die casting cavity surface, is coated with a substantially continuous thin film including a metal oxide of tungsten or molybdenum or mixtures thereof and carbon in the amorphous or crystalline allotropic form. A composition used in a method to provide the coating over the surface includes the carbon in the amorphous or crystalline allotropic form suspended in a liquid including water and the metal oxide or acid of tungsten or molybdenum or mixtures thereof dissolved in a hydroxide. The method of coating the surface includes the steps of providing the surface to be coated with an oxide film, applying the composition over the oxide film, and treating the applied composition to form the substantially continuous thin film including the metal oxide of tungsten or molybdenum or mixtures thereof and the carbon in the amorphous or crystalline allotropic form. The thin film is capable of causing modification of selected properties of the surface related to shaping of metal containing materials.

20 Claims, 2 Drawing Figures

```
APPLYING TO A SURFACE A COMPOSITION INCLUDING
CARBONACEOUS MATERIAL SUSPENDED IN A SOLUTION
OF WATER AND AN OXIDE OR ACID OF A REFRACTORY
METAL DISSOLVED IN A HYDRATE
```

```
TREATING THE APPLIED COMPOSITION TO FORM
A SUBSTANTIALLY CONTINUOUS THIN FILM
INCLUDING AN OXIDE OF REFRACTORY METAL
AND CARBONACEOUS MATERIAL OVER THE SURFACE
```

METHOD OF COATING A DIE CAVITY SURFACE AND THE COATED SURFACE

The present invention relates to a composition for application to a surface used to form metals, to the method of applying the composition to the surface, and to a substantially continuous thin film that is the product of the method. The thin film is capable of causing modifications of selected properties of the surface related to shaping of metal containing materials. More particularly, the composition includes carbon in the amorphous or crystalline allotropic form suspended in a liquid including water and a metal oxide or acid of tungsten or molybdenum or mixtures thereof dissolved in a hydrate. The method of applying the composition to the surface includes the steps of providing the surface to be coated with an oxide film, applying the composition over the oxide film on the surface to be coated, and treating the applied composition to form a substantially continuous thin film including a metal oxide of tungsten or molybdenum or mixtures thereof and carbon. The thin film includes the metal oxide of tungsten or molybdenum or mixtures thereof and carbon in the amorphous or crystalline allotropic form.

Lubricants for application to a surface or cavity of a die used to cast metals such as aluminum have been known for years. Functions of the lubricant are to provide the die cavity with a thin film that aids in the ejection of a casting from the cavity by reducing the tendency of the cast to solder to the surface of the die cavity and helps to keep mechanical erosion of the surface of the die cavity to a minimum.

In the past oil and grease lubricants for die cavities have been widely used. To improve the releasing or ejecting power of the oil and grease lubricants, graphite is added. However, lubricants containing graphite tend to stain and discolor some castings. Where staining and discoloration of a casting is a problem, aluminum powder is added to the lubricant. However, aluminum tends to cling to the surface of some castings and build-up on the surface of the die cavity.

The more widely presently used die cavity lubricants are typically divided into two general classes. These classes are solvent base lubricants and water base lubricants. The solvent base lubricants include pigmented solvent base lubricants and non-pigmented solvent base lubricants. Typical pigmented solvent base lubricants are of very high molecular weight petroleum residue oils or wax or fats or synthetic fats with powdered solids such as aluminum, graphite or mica and a solvent carrier of low molecular weight such as diesel fuel, kerosene and the like. Typical non-pigmented solvent base lubricants are of oil with synthetic polymers of giant molecular weight and a solvent such as diesel fuel, kerosene and the like. The water base lubricants have some wetting and spreading problems and are generally considered to be inferior in such properties to the solvent base lubricants. However, the water base lubricants have obvious safety factor and air pollution advantages over some solvent base lubricants. If the water is properly treated for removal of minerals, contamination of the cavity surface by carbon and other minerals is minimized.

The use of a tungsten base or molybdenum base die for casting aluminum tends to result in oxidation of the refractory metal and soldering of the aluminum casting to the die cavity even though a conventional lubricant is applied over the die cavity surface prior to casting. Oxidation of the refractory metal renders the metal susceptible to mechanical erosion by flowing molten metal. Such results are probably because the lubricant does not always provide a continuous film over the die cavity surface. Under such circumstances, the presence of molten aluminum in the die cavity establishes a condition wherein oxidation of the refractory metal occurs at the surface of the die cavity. The oxidation does not become apparent immediately but appears to occur after continued use. Oxidation of the refractory metal cavity surface has as one result the mechanical erosion of oxidized surfaces. Mechanically eroded oxidized refractory metal flakes of the die cavity surface cling to the surface of the aluminum cast part because of being washed from the die cavity surface. Washing of oxidized refractory metal material from the die cavity surface distorts the contour of the die cavity. Coating the cavity surface of the tungsten base or molybdenum base die with a conventional lubricant of the type discussed above does not appear to solve the problems of oxidization of the refractory metal and mechanical erosion of the die cavity surface. Among other things, the conventional lubricant appears to have a discontinuous surface which allows molten metal to contact the metal surface of the die cavity. At points where the molten metal contacts the metal of the cavity surface, that is, where the conventional lubricant does not completely cover the surface of the cavity of the die, there is a tendency for that point of the surface to be subjected to conditions which appear to cause oxidation of the refractory metal ultimately resulting in mechanical erosion of the refractory metal; and there is a tendency for the molten metal to solder to the die surface at such points which impedes the removal of the cast metal from the die cavity.

In casting aluminum in a die cavity having a surface of tungsten-molybdenum-nickel-iiron or molybdenum-titanium-zirconium, oxidation of the refractory metal constituent by molten aluminum or soldering of molten aluminum to the cavity of the die is minimized by providing the cavity with a thin substantially continuous film including a metal oxide of tungsten or molybdenum or mixtures thereof and carbon in the amorphous or crystalline allotropic form. The presently preferred thickness of the film over the die cavity surface of tungsten-molybdenum-nickel-iron is about 5 microns thick. The presently preferred film is substantially continuous and consists essentially of an oxide of tungsten ($WO_3$) and graphite. A preferred lubricant applied over the oxide of tungsten and graphite film is a pigmented solvent base material such as graphite and wax. It is to be understood that the use of the substantially thin film of the present invention is not a susbstitute for the conventional casting lubricant but is to be used in addition to such conventional lubricant.

A feature of the present invention is to provide a refractory metal base die cavity for forming metal such as casting molten aluminum with a covering of a thin substantially continuous film including a metal oxide of tungsten or molybdenum or mixtures thereof and carbon in the amorphous or crystalline allotropic form. Another feature of the invention is a method of providing the die cavity with such a film. The method includes the steps of providing the surface of the die cavity with an oxide film, and treating a composition applied to the surface to form the substantially continuous film. A further feature of the invention is the composition adapted to be applied to the surface of the die cavity which consists essentially of carbon in the amorphous or crystalline allotropic form suspended in a liquid including water and a metal oxide or acid of tungsten or molybdenum or mixtures thereof dissolved in a hydroxide.

In the drawing:

FIG. 1 illustrates the steps of providing a surface with a film of the present invention; and FIG. 2 is a photomicrograph of the film of the present invention over the surface.

Referring now to FIG. 1 of the drawing, carbon in the crystalline allotropic form, such as colloidal graphite, or carbon in the amorphous form, such as lampblack, is suspended in a liquid such as water. It is presently preferred that the carbon form be colloidal graphite. An oxide of tungsten ($WO_3$) or molybdenum ($MoO_3$) or mixtures thereof or acids of such refractory metals ($H_2WO_4$, $H_2MoO_4$) is dissolved in a liquid hydroxide such as ammonium hydroxide ($NH_4OH$), sodium hydroxide (NaOH), potassium hydroxide (KOH) and the like. The presently preferred metal is tungsten oxide ($WO_3$), the presently preferred acid is tungstic acid ($H_2WO_4$), and the presently preferred hydroxide for dissolving such oxides or acids is ammonium hydroxide ($NH_4OH$). It should be understood that acids of the metal oxides such as tungstic acid ($H_2WO_4$) can be substituted for tungsten oxide ($WO_3$) as long as the acid of such refractory metal is capable of being dissolved in the hydroxide. The water containing the suspended carbon (colloidal graphite) is blended with the solution of dissolved metal oxide ($WO_3$) or acid ($H_2WO_4$) in the hydroxide ($NH_4OH$) to provide a composition of matter for application to the surface of the die cavity.

Generally speaking, the composition can include carbon in the amorphous or crystalline allotropic form suspended in a solution of water and an oxide or acid of a refractory metal or mixtures thereof dissolved in a hydroxide. The presently preferred composition consists essentially of colloidal graphite suspended in a solution of water and an oxide of tungsten ($WO_3$) or tungstic acid ($H_2WO_4$) dissolved in ammonium hydroxide ($NH_4OH$).

A composition consisting essentially of colloidal graphite suspended in a solution of water and oxide of tungsten ($WO_3$) dissolved in ammonium hydroxide includes 10 to 50 wt. percent colloidal graphite,, 5 to 40 wt. percent ammonium hydroxide, 2 to 15 wt. percent of the oxide of tungsten, and 70 to 30 wt. percent water. It is to be understood that liquid hydroxide is to be present in quantities sufficient to dissolve the refractory metal oxide present in the composition. The presently preferred composition consists essentially of 20 to 30 wt. percent colloidal graphite, 15 to 25 wt. percent ammonium hydroxide, 1 to 10 wt. percent of an oxide of tungsten and 60 to 40 wt. percent water. The presently most preferred composition consists essentially of 24 wt. percent colloidal graphite, 18 wt. percent ammonium hydroxide, and 2 wt. percent of an oxide of tungsten, the balance water. A preferred composition including tungstic acid ($H_2WO_4$—solid) consists essentially of 20 to 30 wt. percent colloidal graphite, 15 to 25 wt. percent ammonium hydroxide, 0.5 to 2 wt. percent tungstic acid, the balance water.

Prior to applying the composition to a surface such as the surface of the cavity of a die including a refractory metal, the surface of the die cavity is provided with an oxide film such as by oxidizing the refractory metal in an oxidizing atmosphere. For example, the surface of a die cavity of 90 wt. percent tungsten, 4 wt. percent Ni, 4 wt. percent Mo and 2 wt. percent Fe is heated in air to 700–800°C, preferably 750°C, for a period of time sufficient to oxidize the refractory metal (W) at the surface of the cavity to a depth that is about 5 microns. It is presently believed that providing the surface of the cavity with a thin refractory metal oxide is better than providing the surface with a thick refractory metal oxide. Preferably, the hot, oxidized surface is immersed in a bath of the composition at about room temperature. It is preferred that the oxidized surface of the cavity be immersed in the bath of the composition while the surface is at a temperature of 600°C or higher. The surface should remain immersed in the bath of the composition until the composition ceases to boil. The surface is removed from the bath and reheated to a temperature for a sufficient length of time to remove residual hydroxide and water, generally to a temperature of 350°C to 400°C for several minutes. The coated surface is air cooled, cleaned and inspected.

90 wt. percent tungsten, 4 wt. percent molybdenum, 4 wt. percent nickel, 2 wt. percent iron surfaces with a 5 micron thick coating consisting essentially of colloidal graphite and tungsten oxide immersed in molten aluminum at about 675°C for 24 hours exhibits a weight change of about 0.0237 wt. percent. 90 wt. percent tungsten, 4 wt. percent molybdenum, 4 wt. percent nickel, 2 wt. percent iron surfaces without such a coating immersed in molten aluminum at about 675°C for 24 hours exhibits a weight change of about 0.124 wt. percent.

The following Examples serve to further illustrate the invention.

EXAMPLE I

A surface of 90 wt. percent W, 4 wt. percent Mo, 4 wt. percent Fe, and 2 wt. percent Fe is heated to 750°C in an oxidizing atmosphere for a sufficient length of time to form a tungsten oxide film about 3 to 5 microns thick over the surface. The surface is immersed in a liquid composition of 24 wt. percent colloidal grraphite suspended in a solution of 18 wt. percent ammonium hydroxide, 2 wt. percent tungsten oxide ($WO_3$) and 56 wt. percent water. The surface remains in the composition until boiling of the composition ceases. The surface is removed from the bath and excess water and ammonium hydroxide are removed by any suitable means such as by heating to 350°C to 400°C. The surface is inspected and a suitable lubricant for casting of aluminum is applied. Suitable lubricants include a colloidal graphite solution in water, oil or kerosene such as D—6 KG Super (a wax base graphite suspension with water) made by the Chemtrend Co. of Howell, Michigan, U.S.A.

FIG. 2 illustrates a 90 wt. percent W, 4 wt. percent Mo, 4 wt. percent Ni, and 2 wt. percent Fe material 10 with a 5 micron thick coating 11 of colloidal graphite-tungsten oxide ($WO_3$) prepared using the method of Example 1. A suitable lubricant has not yet been applied over coating 11. Note the continuity at the interface 12 between the surface of materal 10 and the coating 11.

EXAMPLE II

A surface of 90 wt. percent W, 4 wt. percent Mo, 4 wt. percent Fe, and 2 wt. percent Fe is heated to 750°C in an oxidizing atmosphere for a sufficient length of time to form a tungsten oxide film about 3 to 5 microns thick over the surface. The surface is immersed in a liquid composition of 24 wt. percent colloidal graphite suspended in a solution of 18 wt. percent ammonium hydroxide, 2 wt. percent tungstic acid ($H_2WO_4$—solid) and 56 wt. percent water. The surface remains in the composition until boiling of the composition ceases. The surface is removed from the bath and excess water and ammonium hydroxide are removed by any suitable means such as by heating to 350°C to 400°C. The surface is inspected and a suitable lubricant for casting of aluminum is applied. Suitable lubricants include a colloidal graphite solution in water or kerosene.

The presence of small amounts of impurity elements in the composition and/or in the film of graphite and the oxide of the refractory metal are not believed to play a critical role in the invention. It should be understood, however, that it is contemplated that other elements can be present in the composition and the film of graphite and the oxide of the refractory metal, and such practices are considered within the parameters of the invention herein defined.

While the invention is described in presently preferred embodiments, it will be understood that modifications and variations may be effected without departing from the scope of the novel concepts of the invention.

We claim:

1. An article having a surface adapted to shape metal containing materials, the surface coated with a substantially continuous thin film capable of causing modification of properties of the surface of the article related to shaping of metal containing materials, the film including an oxide of a refractory metal and carbon selected from the group consisting of amorphous and crystalline allotropic forms.

2. The article of claim 1, wherein the article is a cavity for casting molten metals.

3. The article of claim 1, wherein the surface includes a refractory metal.

4. The article of claim 3, wherein the surface is a tungsten or a molybdenum base material.

5. The article of claim 4, wherein the tungsten base material includes a composite of tungsten-molybdenum-nickel and iron, and the molybdenum base material includes a composite of molybdenum-titanium-zirconium.

6. The article of claim 1, wherein the surface is a die casting surface consisting essentially of W, Mo, Ni and Fe or Mo, Ti and Zr.

7. The article of claim 1, wherein the surface consists essentially of 90 wt. percent W, 4 wt. percent Mo, 4 wt. percent Ni and 2 wt. percent Fe and the film consists essentially of tungsten oxide and graphite.

8. The article of claim 1, wherein the carbon form is colloidal graphite.

9. The article of claim 8, wherein the film consists essentially of tungsten oxide and graphite.

10. A method of coating a surface of an article adapted to shape metal containing material, the method comprising the steps of applying to the surface a composition including carbon selected from the group consisting of amorphous and crystalline allotropic forms suspended in liquid and an oxide or acid of refractory metal dissolved in a hydroxide, and removing liquid from the applied composition to form a substantially continuous thin film including an oxide of refractory metal and carbon selected from the group consisting of amorphous and crystalline allotropic forms over the surface, the film capable of causing modification of properties of the surface of the article related to shaping of metal containing material.

11. The method of coating a surface as claimed in claim 10, wherein the surface incudes a refractory metal and is provided with an oxide film of a refractory metal prior to the step of applying the composition to the surface.

12. The method of coating a surface as claimed in claim 11, wherein the composition consists essentially of carbon selected from the group consisting of amorphous or crystalline allotropic forms suspended in a solution of water and an oxide of tungsten or molybdenum or an acid of tungsten or molybdenum dissolved in a hydroxide selected from the group consisting of ammonium hydroxide, sodium hyroxide and potassium hydroxide.

13. The method of coating a surface as claimed in claim 11, wherein the composition consists essentially of graphite suspended in a solution of water and $WO_3$ or $H_2WO_4$ dissolved in ammonium hyroxide.

14. The method of coating a surface as claimed in claim 13, wherein the composition consists essentially of about 10 to about 50 wt. percent graphite, about 5 to about 40 wt. percent ammonium hydroxide, about 2 to about 15 wt. percent tungsten oxide, and about 70 to about 30 wt. percent water.

15. The method of coating a surface as claimed in claim 14, wherein the composition consists essentially of about 20 to about 30 wt. percent graphite, about 15 to about 25 wt. percent ammonium hydroxide, about 1 to about 10 wt. percent tungsten oxide, and about 60 to about 10 wt. percent water.

16. The method of coating a surface as claimed in claim 15, wherein the composition consists essentially of about 24 wt. percent graphite, about 18 wt. percent ammonium hydroxide, about 2 wt. percent tungsten oxide, and about 56 wt. percent water.

17. The method of coating a surface according to claim 11, including the step of prior to immersing the surface in the composition, heating the surface to a temperature sufficient to form an oxide film of metal over the surface, and immersing the heated surface in the composition prior to cooling the surface to room temperature.

18. The method of coating a surface according to claim 11 wherein the oxide film of a metal is an oxide of tungsten or molybdenum.

19. The method of coating a surface according to claim 18 wherein the surface is a die casting surface consisting essentially of W, Mo, Ni and Fe with a thin oxide of tungsten over the surface or Mo, Ti and Zr with a thin oxide of molybdenum over the surface.

20. The method of coating a surface according to claim 10, wherein the composition is applied by immersing the surface into the composition.

* * * * *

UNITED STATES PATENT OFFICE
CERTIFICATE OF CORRECTION

PATENT NO. : 3,865,608
DATED : 102/11/75
INVENTOR(S) : Alexander S. Borbely and Jon A. Bereman It is certified that error appears in the above-identified patent and that said Letters Patent are hereby corrected as shown below:

Col. 1 line 14, Delete "mixitures" and substitute therefore ---mixtures---

Col. 1 line 15, Delete "hydrate" and substitute therefore --hydroxide---

Col. 2 line 38, Delete "iiron" and substitute therefore ---iron---

Col. 4 line 44, Delete "grraphite" and substitute therefore ---graphite---

Signed and Sealed this ninth Day of September 1975

[SEAL]

Attest:

RUTH C. MASON
Attesting Officer

C. MARSHALL DANN
Commissioner of Patents and Trademarks